United States Patent
Farinone

(10) Patent No.: US 9,133,961 B2
(45) Date of Patent: Sep. 15, 2015

(54) VALVE IN PARTICULAR FOR TANKS CARRIED BY VEHICLES

(71) Applicant: METALTECNICA S.r.l., Prato Sesia (IT)

(72) Inventor: Massimo Farinone, Prato Sesia (IT)

(73) Assignee: METALTECNICA S.R.L., Prato Sesia (Province of Novara) (IT)

(*) Notice: Subject to any disclaimer, the term of this patent is extended or adjusted under 35 U.S.C. 154(b) by 144 days.

(21) Appl. No.: 13/820,927

(22) PCT Filed: Oct. 26, 2012

(86) PCT No.: PCT/IB2012/055909
§ 371 (c)(1),
(2) Date: Mar. 5, 2013

(87) PCT Pub. No.: WO2013/061291
PCT Pub. Date: May 2, 2013

(65) Prior Publication Data
US 2014/0096843 A1   Apr. 10, 2014

(30) Foreign Application Priority Data

Oct. 27, 2011  (IT) .............................. TO2011A0976

(51) Int. Cl.
| F16K 49/00 | (2006.01) |
| F16K 3/12  | (2006.01) |
| F16K 27/04 | (2006.01) |

(52) U.S. Cl.
CPC .................. *F16K 49/005* (2013.01); *F16K 3/12* (2013.01); *F16K 27/047* (2013.01); *Y10T 29/49405* (2013.01); *Y10T 137/6579* (2013.01)

(58) Field of Classification Search
CPC ....... F16K 3/12; F16K 27/047; F16K 49/005; Y10T 29/49405; Y10T 137/6579
USPC ............................ 137/340; 251/193, 301, 326
See application file for complete search history.

(56) References Cited

U.S. PATENT DOCUMENTS

| 250,558 A | * | 12/1881 | Massicks ...................... 432/218 |
| 734,081 A |   | 7/1903  | McConnell |

(Continued)

FOREIGN PATENT DOCUMENTS

| CA | 2 792 387  | 9/2013  |
| DE | 10 98 308  | 1/1961  |
| DE | 35 18 206  | 11/1986 |

OTHER PUBLICATIONS

Canadian Office Action issued May 20, 2014 in applicant's corresponding Canadian Patent Application No. 2,809,254 (corresponding to PCT Application No. PCT/IB2012/055909).

(Continued)

*Primary Examiner* — Kevin Murphy
(74) *Attorney, Agent, or Firm* — Nixon & Vanderhye, PC

(57) ABSTRACT

An anti-freezing valve (1) comprises:
- a valve body (2) made of metal material (M), defining a passageway (5) for a liquid;
- an open/close member (9), mounted displaceable in the valve body (2),
- an anti-freezing arrangement.

The valve body (2) is a valve body obtained by casting, which defines a valve seat (8), with respect to which the open/close member (9) is displaceable in a slidable manner between a raised position of opening and a lowered position of closing of the passageway (5).

Embedded in the metal material (M) constituting the valve body (2) is an axially extended hollow member (13), belonging to the anti-freezing arrangement, for the passage of a thermovector fluid (F), the hollow member (13) having respective ends (14) accessible from outside the valve body (2), for connection to a circuit of the thermovector fluid (F). The valve (1) has preferred application on vehicles for the transport of liquids, in particular tankers, gully emptiers and similar vehicles for transporting waste water and sewage.

25 Claims, 6 Drawing Sheets

(56) References Cited

U.S. PATENT DOCUMENTS

| | | | |
|---|---|---|---|
| 2,048,696 A * | 7/1936 | Hellan | 137/340 |
| 3,901,269 A | 8/1975 | Henderson | |
| 4,542,763 A * | 9/1985 | Gardner et al. | 137/340 |
| 2010/0133453 A1 | 6/2010 | Hoppe et al. | |
| 2013/0248015 A1 | 9/2013 | Velatta et al. | |

OTHER PUBLICATIONS

International Search Report for PCT/IB2012/055909 mailed Jan. 22, 2013.

Written Opinion of the International Searching Authority mailed Jan. 22, 2013.

* cited by examiner

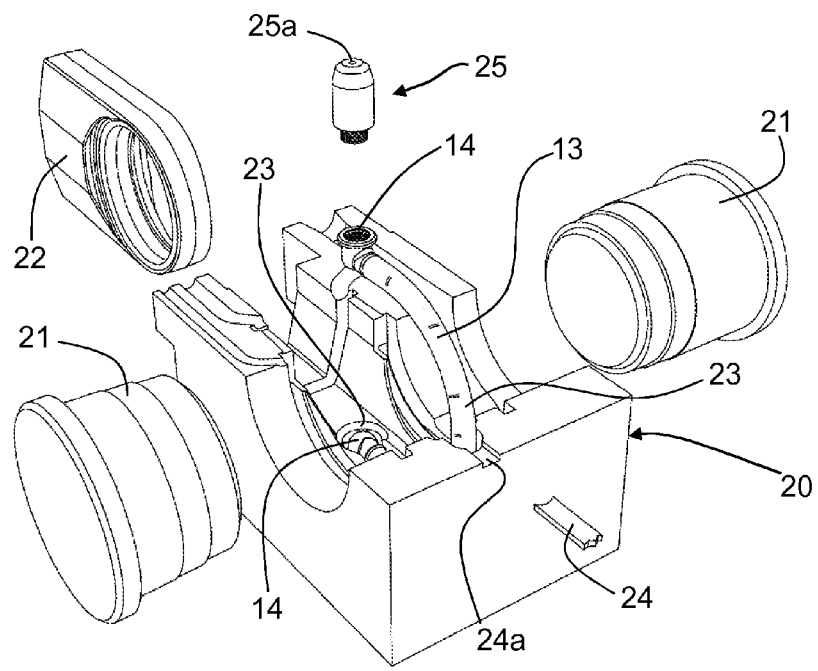
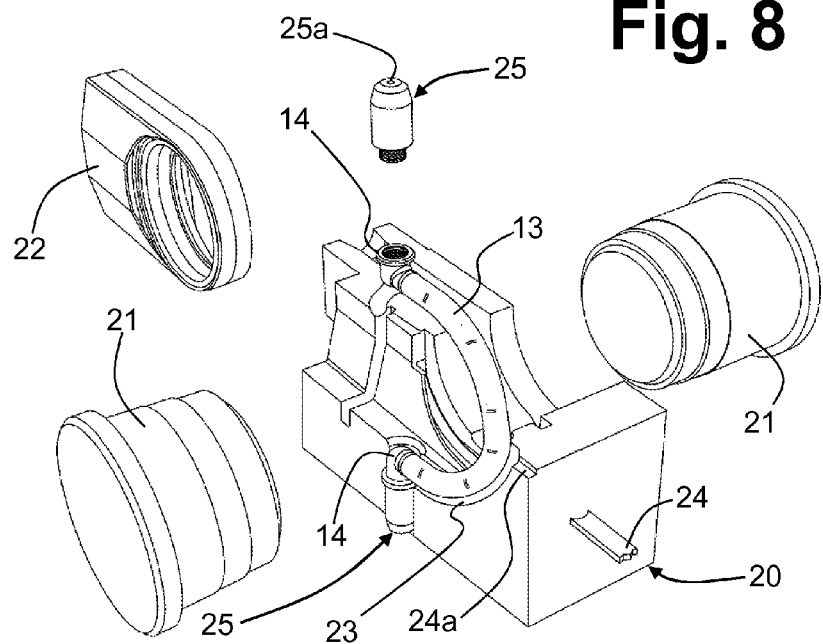

US 9,133,961 B2

VALVE IN PARTICULAR FOR TANKS CARRIED BY VEHICLES

This application is the U.S. national phase of International Application No. PCT/IB2012/055909 filed 26 Oct. 2012 which designated the U.S. and claims priority to IT TO2011A000976 filed 27 Oct. 2011, the entire contents of each of which are hereby incorporated by reference.

FIELD OF THE INVENTION

The present invention relates to the field of anti-freezing valves for systems of distribution and/or storage of liquids, and has been developed with particular reference to valves for tanks carried by vehicles, such as tankers, gully emptiers and the like, in particular for the treatment of waste water and sewage and liquids in general.

PRIOR ART

The tanks of vehicles of the type referred to above are typically equipped with control valves, to which there is, for example, connected an assembly for charging and/or discharging sewage.

Considering the type of use, said valves have a very sturdy structure and are generally made of a number of pieces assembled together in a fluid-tight way. Notwithstanding their characteristics of strength, said valves are usually subject to problems of freezing on account of the particularly severe conditions of use.

It is generally known that a valve used for controlling the flow of a liquid may partially or completely lose its functionality, if exposed to ambient temperatures lower than 0° C., in particular in the presence of residue of liquid inside the valve. The situation then becomes particularly critical in the case where the ambient temperature drops several degrees below zero (−20/−40° C.): in such conditions, the valve may in fact get blocked even though there is no substantial presence of liquids inside it.

The above problem is particularly felt in the case of valves that equip tanks of vehicles above all during the winter months. For example, in areas with particularly rigid climates, the problem highlighted may block, even for several months of the year, proper operation of lorries used for activities of gully emptying, transport or disposal of sewage or liquids in general.

In the present state of the art, in order to overcome the problem of freezing of the valves referred to above, it is known to use heating devices with electrical resistances, which are mounted on the outside of the structure of the valve. Said devices are, however, costly, inconvenient to apply to the structure of the valve and presuppose the presence of electrical connections. Said known devices moreover present the drawback of transmitting heat in a concentrated way over modest portions of the structure of the valve, frequently in a position relatively remote from the critical area represented by the sealing seat of the open/close member of the valve. It would moreover be desirable to avoid the presence of electrical components in the proximity of hydraulic members.

There have also been proposed hot-fluid heating devices, which are also applied on the outside of the structure of the valve and inside which the liquid of the vehicle cooling circuit is made to circulate, via purposely provided branch pipes. Also fluid heating devices are generally costly and difficult to apply, given that the possible anchorage points offered by the valve are limited (typically, in fact, the device must be anchored exploiting the screws for securing a bonnet of the valve). The unfreezing capacity afforded by these fluid devices is on average good, but the difficulty of obtaining a precise coupling of the heating device with the structure of the valve involves considerable dispersion of heat.

Aim and Summary of the Invention

The aim of the present invention is basically to overcome the functional deficiencies referred to above of known heating systems for valves of tanks carried by vehicles. A further aim of the invention is to obtain the aforesaid results in a simple and low-cost way.

With a view to achieving the above purposes, the subject of the invention is a valve having the characteristics specified in claim 1. Preferred characteristics of the invention are indicated in the dependent claims. The claims form an integral part of the technical teaching provided herein in relation to the invention.

BRIEF DESCRIPTION OF THE DRAWINGS

The invention will now be described, purely by way of non-limiting example, with reference to the annexed drawings, wherein:

FIG. 7 is schematic perspective view of a half-chill used for production of the main body of a valve according to the invention; and FIG. 8 is a sectioned perspective view of the half-chill of FIG. 7.

DESCRIPTION OF EMBODIMENTS OF THE INVENTION

Figure 1:
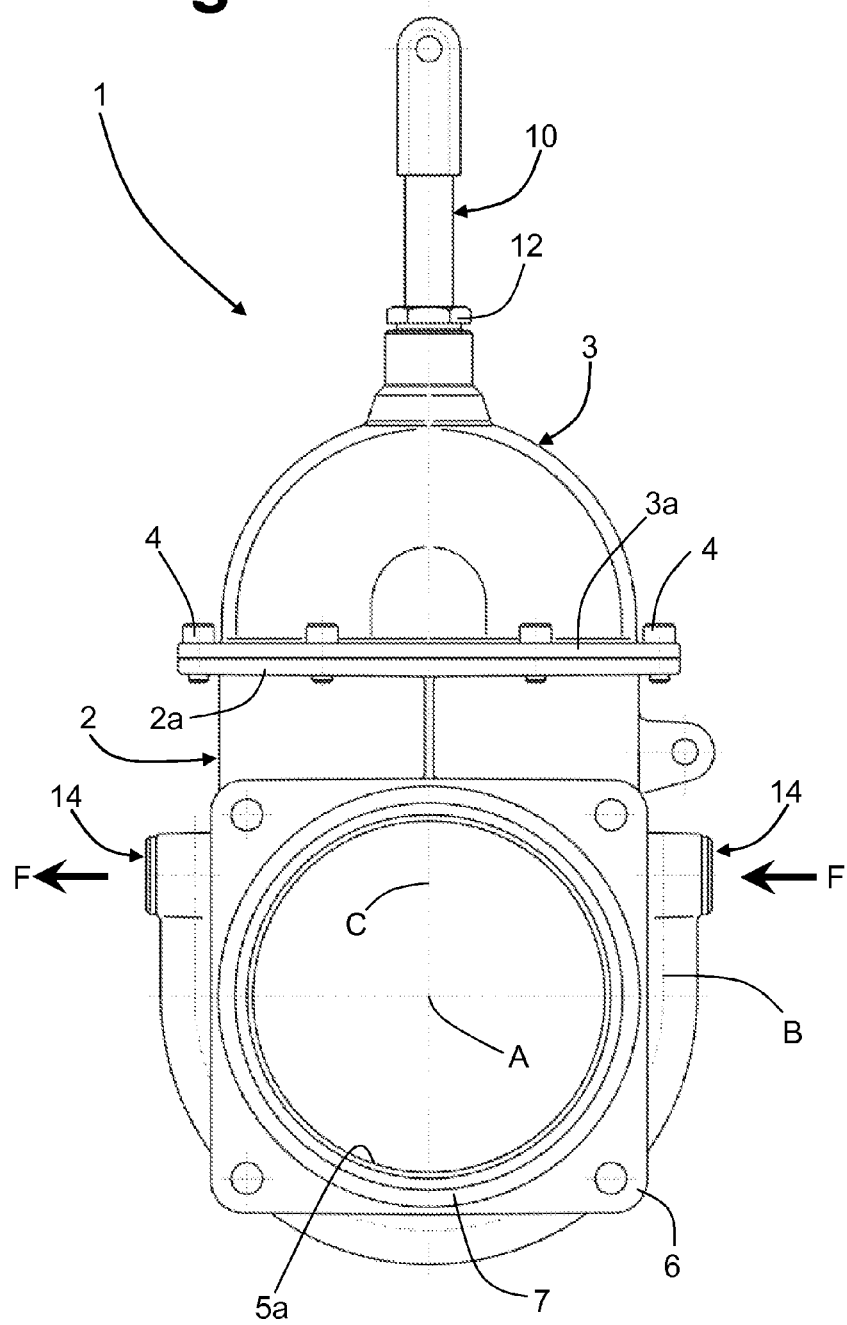
FIGS. 1 and 2 are a front elevation and a side elevation of a valve according to the invention.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in various parts of the present description do not necessarily all refer to one and the same embodiment. Moreover, the particular configurations, structures, or characteristics may be combined in any adequate way in one or more embodiments. The references used in what follows are provided only for convenience and do not define the sphere of protection or the scope of the embodiments.

Designated as a whole by 1 in FIGS. 1 to 4, is an anti-freezing valve obtained according to one embodiment of the invention. In the example represented, the valve 1 is a gate valve, in particular a plunger valve. The general structure of the valve 1 is substantially known, apart from the characteristics that form the specific subject of the invention.

In the example represented, the valve 1 comprises a valve body 2, to which the invention refers specifically, mounted in a fluid-tight way on which is a head or bonnet 3, preferably with interposition of sealing means (not shown). In the example, defined at the interface regions between the body 2 and the head 3 are respective flanges 2a and 3a, fixed to one another by screws 4.

Figure 2:
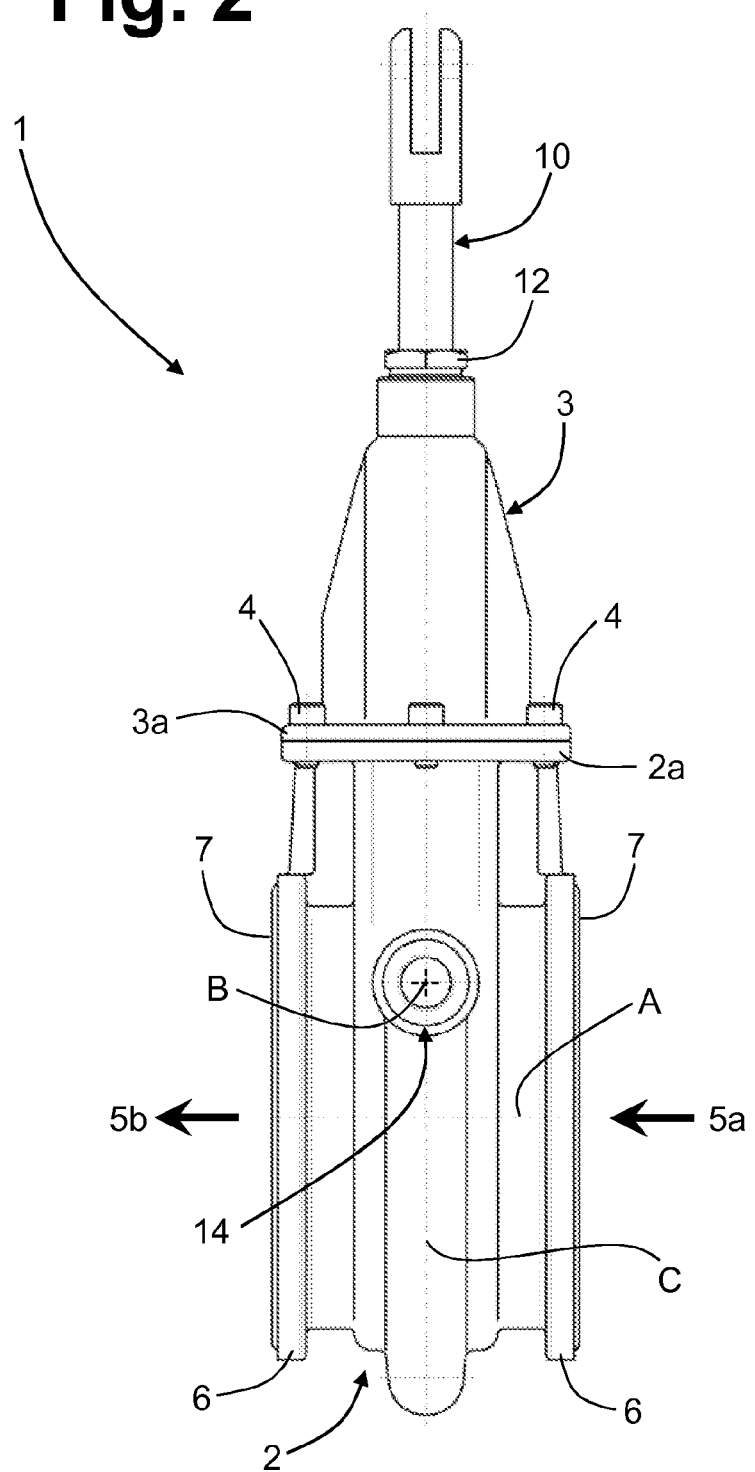
Figure 3:
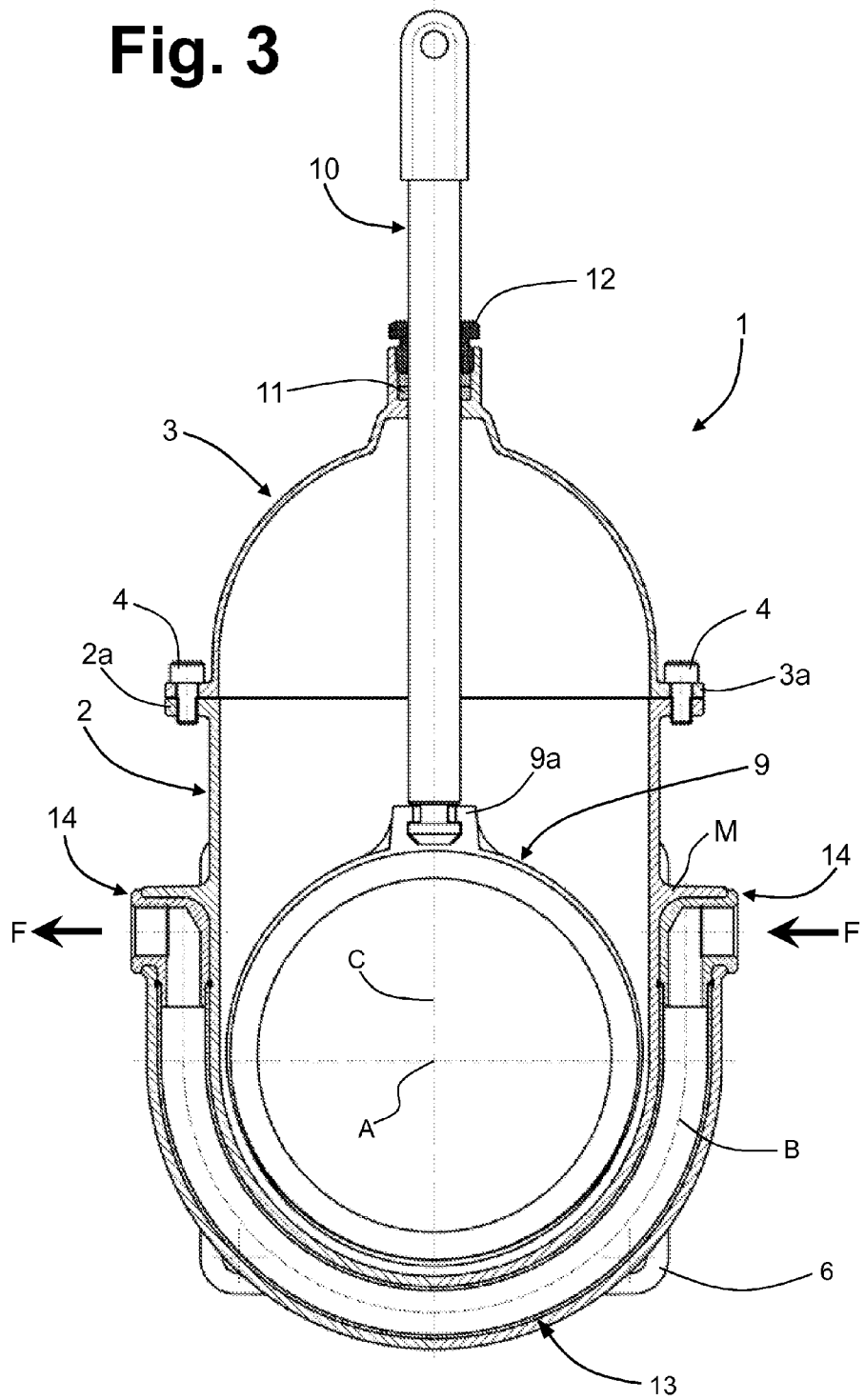
FIGS. 3 and 4 are schematic views like those of FIGS. 1 and 2, in partial cross-sectional view.
Figure 4:
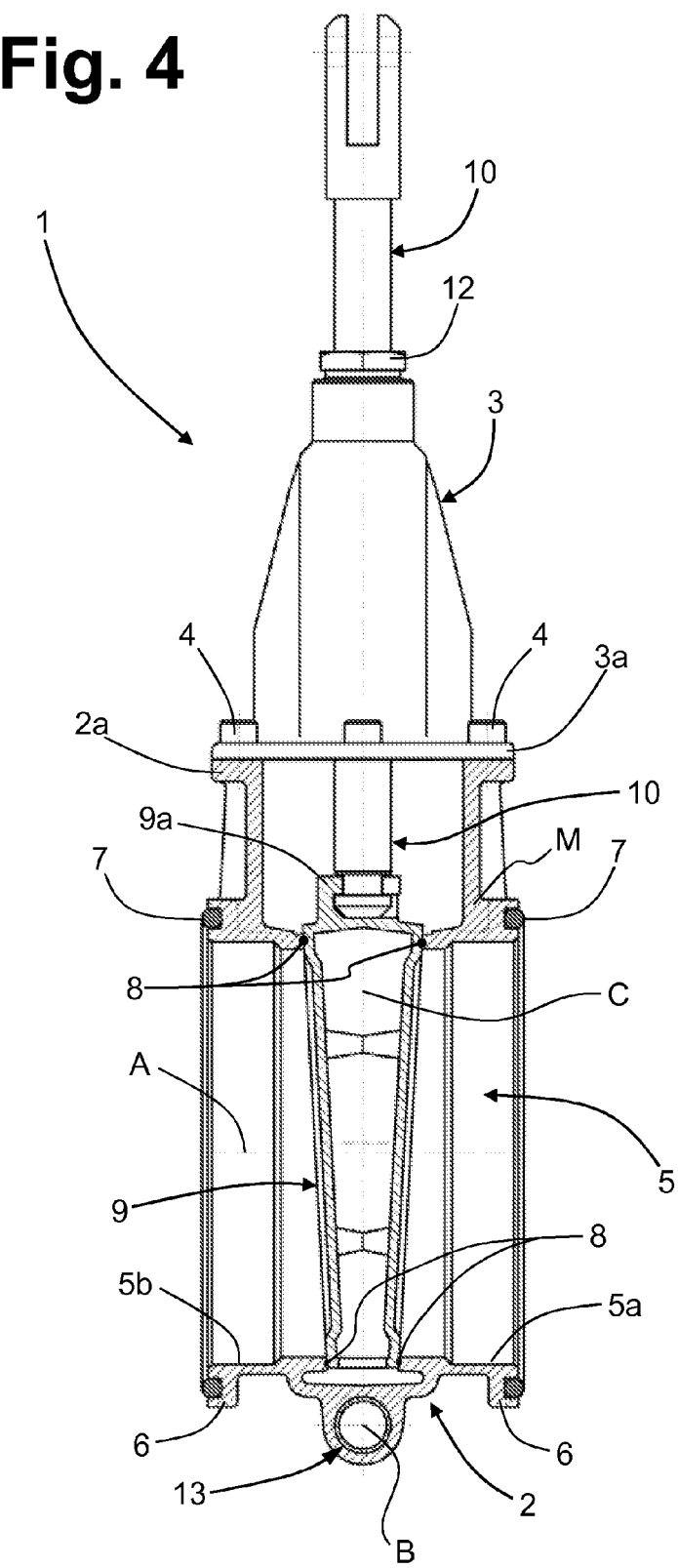

The valve body 2 is made of metal material and, as may be seen in particular in FIGS. 3 and 4, defines a passageway 5 having two ends 5a and 5b for the liquid to be controlled, which here is assumed as being sewage (it is to be noted that the direction of the arrows 5a and 5b of FIG. 2 is presented merely by way of example, in so far as the end mouths of the passageway 5 can function alternatively as inlet and as outlet of the valve 1). The passageway 5 extends along a respective axis A between the ends 5a and 5b. By way of indication, for application of the valve 1 to tanks for sewage, the nominal diameter of the passageway 5 may be comprised between 50 mm and 190 mm.

The valve body 2 is obtained by casting, for example in brass. Also the head 3 may be made of a single piece obtained by casting.

At the two opposite ends of the passageway 5, the valve body 2 is preferably shaped so as to define two connection flanges 6, for example, for connection to a tank, on one side, and to an assembly for charging/discharging the sewage, on the other. Preferably, the valve body has a flange or a threaded sleeve at at least one end 5a, 5b of the passageway 5, preferably with a seat for a respective sealing element 7. In the example represented, at each flange 6, the valve body 2 defines at least one seat for a respective seal ring 7, preferably made of elastomer. The valve body 2 could have even a single flange, at just one of the two end mouths 5a and 5b or else could envisage threaded sleeves instead of the flanges.

As may be seen in FIG. 4, in an intermediate position of the passageway 5, between the ends 5a and 5b, the valve body 2 defines a valve seat 8, with respect to which an open/close member or valve member 9 is displaceable between a position of opening and a position of closing, for opening and closing the passageway 5, respectively. In the example, since the valve 1 is a gate valve, the open/close member 9 is mounted slidable at least between a raised position and a lowered position, which correspond to practically complete opening and closing, respectively, of the passageway 5. As may be noted in particular in FIGS. 3 and 4, the open/close member 9 is substantially a wedge open/close member, having a substantially circular peripheral profile; of course, the peripheral profile of the valve seat 8 defined by the valve body 2 is shaped accordingly, to guarantee the required tightness with respect to the open/close member 9. Also the open/close member 9 can be obtained by casting, for example, in brass.

To the head 3 there is associated an actuation arrangement for causing displacements of the open/close member 9 between the lowered position and the raised position. In the example, the body of the open/close member 9 defines at the top a coupling 9a, fitted in which—for example, in a freely rotating way—is the lower end of a manoeuvring stem 10, the upper end of which projects, instead, from the head 3.

The head 3 defines at the top a passage for the stem 10, mounted on which are sealing means 11, for example, one or more gaskets, and a corresponding packing gland 12 (see, for example, FIG. 4).

The stem 10 can be operated, according to modalities in themselves known, to raise and lower the open/close member 9 with respect to the valve seat 8 so as to open and close, respectively, the passageway 5. In the example, the stem 10 can be operated by means of a known linkage (not represented). In other embodiments (not represented either) an internal thread can be provided in the body of the head of the valve, where an external thread of the manoeuvring stem can be engaged: in this way, by turning a handwheel associated to the top end of the stem in a counterclockwise direction and in a clockwise direction, and given the coupling with possibility of rotation between the bottom end of the stem and the open/close member, it is possible to bring about raising and lowering, respectively, of the open/close member with respect to the valve seat. Of course, it is also possible to envisage a servo mechanism for operating the manoeuvring stem.

According to the main characteristic of the invention, the valve 1 has an anti-freezing arrangement, including an axially extended hollow member which is embedded in the metal material M (FIGS. 3-5) constituting the valve body 2, for the passage of a thermal carrier fluid, where said hollow member has respective inlet and outlet ends for the fluid, that are accessible from outside the valve body 2 to enable connection of the hollow member to a circuit for the thermal carrier fluid.

In the example of embodiment illustrated, the aforesaid hollow member comprises a pipe or tube 13. Preferably, the tube 13 is made of a metal material different from the one constituting the valve body 2. A material preferred for this purpose is stainless steel, which has considerable resistance to corrosion.

The ends of the hollow member, for entry and exit of the fluid, are accessible on the outside of the valve body 2 and comprise hollow terminals or fittings 14 to facilitate connection to the circuit of the thermal carrier fluid, represented in the figures by the arrows F, which is here assumed to be a hot liquid circulating in a cooling system of the engine of a vehicle that carries the tank to which the valve 1 is associated.

In the embodiment exemplified, the pipe fittings 14 are configured as components distinct from the tube 13 and are coupled thereto. In the example, and as may be seen in FIG. 5, the pipe fittings 14, which are also preferably made of metal material, such as, for example, stainless steel, are substantially L-shaped fittings, having a bottom end 14a that is fitted in the respective end of the tube 13, and preferably fixed via welding. It is also possible to envisage a threaded coupling between the ends of the tube 13 and the respective pipe fittings 14.

The upper end of each pipe fitting 14 faces the outside of the valve body 2. At said upper end, the body of each pipe fitting 14 can define a flange 14b, as in the case illustrated, which preferably projects from the valve body 2.

It will thus be appreciated that, in the embodiment illustrated, the tube 13 is completely embedded or englobed in the metal material M constituting the valve body 2, whilst the pipe fittings 14 for inlet and outlet of the heating fluid are only partially embedded in said metal material so as to remain exposed at least for a connection part thereof. Preferably, and as may be seen in the detail of FIG. 5, the connection part of the pipe fittings is provided with a thread 14c for connection—for example, via external threaded pipe fittings 15 made of metal or synthetic material and with interposition of a gasket 16—to a respective branch pipe 17 in which the heating fluid passes.

It may be noted that, according to alternative embodiments (not represented), the accessible ends of the hollow member—i.e., the connection fittings—can be defined integrally, of a single piece, in the tube 13, which in this case will be appropriately shaped for the purpose. For such a case, the tube 13 will then be embedded for its prevalent part in the material M of the valve body, its ends alone remaining accessible on the outside of the body itself.

According to a particularly advantageous characteristic of the invention, at least a substantial or prevalent portion of the hollow member 13-14 develops along a corresponding portion of the peripheral profile of the valve seat 8, with respect to which the open/close member 9 is slidable between the above said raised and lowered positions. In the case in point, the aforesaid substantial or prevalent portion of the hollow member 13-14 develops in length also substantially parallel to a corresponding portion of the peripheral profile of the open/close member 9; the aforesaid portion of the peripheral profile of the open/close member 9 is closer to the aforesaid substantial portion of the hollow member 13-14 when the open/close member 9 is in the respective lowered position, that is when the valve is closed.

Said characteristic is clearly visible, for example, in FIGS. 3 and 4, where it emerges how the tube 13, embedded in the material M constituting the valve body 2, extends in the proximity of the valve seat 8 for a long stretch of its development, and substantially parallel to a semicircular stretch of the profile of the open/close member 9, generally opposite to the head 3 and/or to the corresponding actuation arrangement. For this purpose, the tube 13 is substantially U-bent, and has a main stretch, that herein extends substantially as an arc of a circle, preferably for not more than 180° or about 180°, substantially parallel to the peripheral profiles of the valve seat 8 and of the open/close member 9 (see in particular FIG. 4). Preferably, the aforesaid main stretch extends between two generally straight stretches of the tube 13, that in the non-limiting example are at least in part substantially parallel to each other and that extend in a direction at least approximately tangent with respect to the peripheral profile of the valve seat 8 or the open/close member 9. Again with reference to the shown preferential embodiment, the main stretch extends sostanzialmente for 180°. In a preferred embodiment, such as the one exemplified, the intermediate stretch shaped as an arc of a circle of the hollow member 13-14 extends parallel to the peripheral profiles of the valve seat 8 and of the open/close member 9 (or, conversely, the hollow member develops along at least half of said peripheral profiles).

Said characteristic is particularly advantageous in so far as the critical area where the effect of freezing is greater is represented by the surfaces of contact between the open/close member and the valve seat. For this purpose, it is also advantageous that—as may be seen in FIG. 3—the hollow member constituted by the tube 13 and by the pipe fittings 14 develops in length according to a respective axis B that is substantially contained in a first plane to which the axis C of the open/close member 9 belongs, i.e., to the sliding axis of the open/close member.

From FIG. 4 it will moreover be appreciated that, in the preferential embodiment illustrated, the aforesaid axis B is also contained in a second plane that is substantially orthogonal to the axis A of the passageway 5 and is substantially parallel to the sliding direction of the open/close member 9 between the lowered and raised positions thereof. With such an arrangement, the accessible ends of the hollow member, i.e., the terminals 14, are located at two opposite faces of the valve body 2, in particular opposite side faces that are transverse with respect to the front and rear faces of the valve body 2, at which are the ends 5a, 5b of the passageway 5. Said characteristic is advantageous for the purposes of branch connection of the hollow member 13-14 to the circuit of the heating fluid.

Use of the valve 1 according to the invention is very simple. In the example considered herein (see FIG. 6), the valve 1 is fixed in a fluid-tight way with its mouth 5a at one opening of the tank T carried by the vehicle, via one of the flanges 6 provided with the corresponding gasket 7. At the mouth 5b there can be connected in a fluid-tight way an assembly for charging/discharging the sewage, or else a simple pipe, for example, exploiting the other flange 6 with the corresponding gasket 7. When the open/close member 9 is brought from the closing position to the opening position, the sewage is free to flow in the passageway 5 between the end mouths 5a and 5b. The accessible ends of the hollow member represented by the pipe fittings 14 are connected to a circuit for the heat-exchange fluid F of a cooling system CS of the vehicle. For this purpose, two branch pipes 17 are used, similar to the ones illustrated in FIG. 5, a delivery one and a return one with respect to the circuit of the cooling system CS. For this purpose, the connection means 15-16 of FIG. 5 may be used. Possibly, as in the case exemplified, along the two pipes 17—the one for delivery of the fluid F towards the valve 1 and the one for return of the fluid towards the cooling system CS—deviator valves or taps V can be provided in order to exclude temporarily circulation of the fluid itself in the hollow member 13-14 of the valve 1.

In the specific example, the fluid F is a liquid used for cooling the vehicle engine, which is conveyed via the delivery pipe 17 to the valve 1 before passing into a corresponding heat exchanger. Said liquid F is hence at high temperature (on average in the region of 60-90° C.) and, as it passes through the hollow member 13-14 of the valve 1, enables unfreezing of the valve 1 and/or, during running of the vehicle, prevents possible freezing thereof. Unfreezing is carried out in a very short time both by virtue of the extended contact between the tube 13 and the valve body 2, which guarantees a high degree of heat exchange, and by virtue of the considerable closeness of the tube 13 to the valve seat 8, as well as by virtue of the fact that the development of the tube 13 follows for a long stretch the peripheral profile of the valve seat 8.

A preferred method for producing the valve body integrating the hollow member is that of chill casting.

The chill used is shaped, according to modalities in themselves known, to obtain the desired shape of the valve body. As regards specifically implementation of the present invention, the chill is additionally provided with means for supporting and positioning the hollow member in order to obtain a uniform coating thereof with the molten material M and prevent at the same time accidental entry of the material itself or of foreign bodies into the hollow member.

FIGS. 7 and 8 illustrate, merely by way of example, one of two half-chills that can be used for producing the valve body 2 described previously. In said figures, designated by 20 is the body of the half-chill, for example, made of alloyed steel, which defines the impression that will bestow on the body 2, together with the other half-chill (not represented), two opposite punches 21 and a central core 22, the necessary shape, including the valve seat.

As regards the case in point, each half-chill 20 defines a seat 23 for positioning a respective portion of the hollow member 13-14. Preferably, moreover, positioned between the two half-chills is an insert 24, which constitutes a further positioning support for the hollow member, in particular in an intermediate region thereof between the two ends. For this purpose, at least one of the half-chills defines a corresponding seat 24a.

In the example represented, the tube 13 is inserted between the half-chills already provided at the respective ends with the pipe fittings 14, previously assembled on the tube itself. Very advantageously, each half-chill 20 also defines a respective seat for a guide pin 25 to bring about correct positioning also at the pipe fittings 14; said pins 25 have a portion coupled to a corresponding seat defined on the outside of the body of the corresponding half-chill, and a portion that is to be fitted to or screwed in the corresponding pipe fitting 14.

According to a preferred methodology of production, the tube or hollow member is inserted in the chill after being pre-heated in order to limit possible thermal reactions during the subsequent step of pouring of the brass or other material that forms the valve body.

Advantageously, the chill formed by the two half-chills has a system for bleeding off any possible gas that might be released inside the hollow member during the step of pouring of the material. In the example, said bleeding system includes a through axial cavity 25a in at least one of the two pins 25.

From the foregoing description, the characteristics and the advantages of the present invention emerge clearly, amongst which the following are to be emphasized:

- simplicity of assembly, given that no operation of assembly of additional external components on the structure of the valve is required;
- ease of connection of the hollow member for the heat-exchange fluid to the vehicle cooling circuit (the valve can be supplied already complete with the pipe fittings 15-16);
- extensive contact between the hollow member 13-14 and the valve body 1, the entire outer surface of the tube being in contact with said body, with unfreezing times markedly reduced with respect to the known art;
- considerable closeness of the hollow member 13-14 to the valve seat 8, which, as explained, is the most critical area in the case of freezing;
- high degree of protection of the heating member 13-14 against any occasional impact, due to the fact that it is embedded in the brass casting that forms the valve body;
- economy of production of the valve.

Of course, without prejudice to the principle of the invention, the details of construction and the embodiments may vary, even significantly, with respect to what has been described and illustrated herein purely by way of non-limiting example, without thereby departing from the scope of the invention, as defined by the ensuing claims.

As has been said, in a preferred embodiment, the tube 13 is made of steel, in particular stainless steel; on the other hand, also other materials can be used for the purpose, provided that they are resistant to corrosion and compatible with the material constituting the valve body. The section of the tube 13 may be circular, oval or of some other shape.

The accessible ends of the member 13-14, i.e., the pipe fittings 14 (whether they are formed in the tube or configured as distinct components) may be with a male or female thread, and the thread may be of any known type (Gas, NPT, metric, etc.). On the other hand, other coupling systems are not ruled out, such as bayonet couplings provided with suitable sealing means. Obviously, the pipe fittings 14 do not necessarily have to be L-shaped, it also being possible for the inlet and outlet of the hollow member to extend in the vertical direction.

Figure 5:
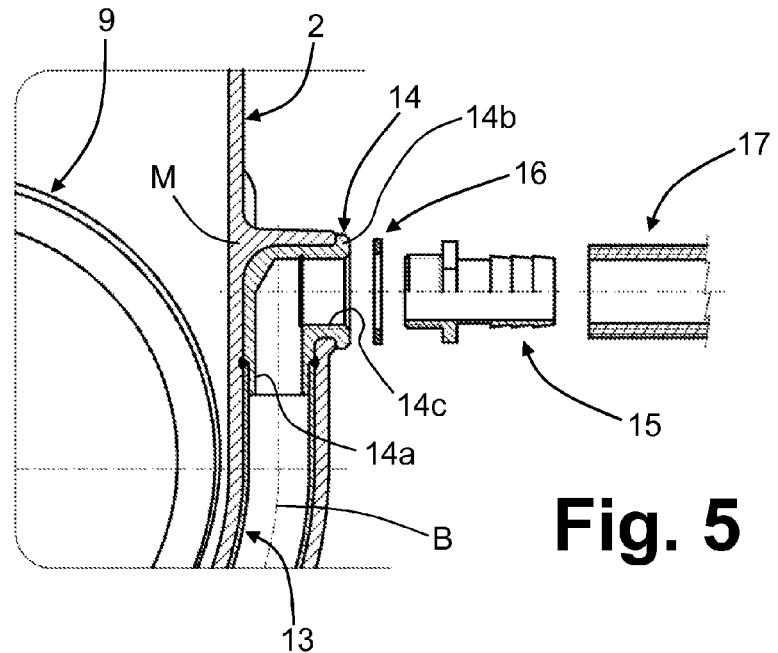
FIG. 5 is a schematic representation in partial cross-sectional view of an arrangement for connection of a valve according to the invention to a circuit for a heat-exchange fluid.
Figure 6:
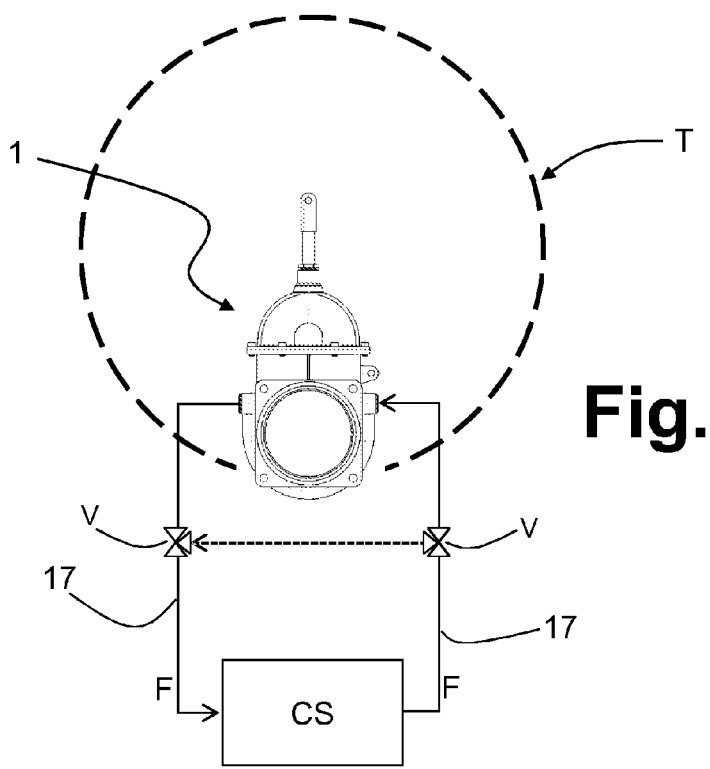
FIG. 6 is a schematic representation of a modality of use of a valve according to the invention.

Even though this complicates to a certain extent production of the valve body 2, the ends of the member 13-14 could be set in with respect to the outer surface of the valve body 2, albeit remaining accessible: in such a case, for example, in the valve body there could be provided passages axially aligned to the ends of the member 13-14 (which, in such a case, may include just the tube 13, possibly flanged at the two ends), with said passages provided with a thread for coupling to an external pipe fitting having functions like the one designated by 15 in FIG. 5.

In the preferred embodiment, the hollow member 13-14 is connected to a pre-existing circuit for the heating fluid, but this is not strictly indispensable: for example, a flow of a hot liquid could be induced in the hollow member 13-14 only in the case of need, for example, via a pump and a delivery pipe connected in an extemporary way to the member itself when there is the need to obtain unfreezing of the valve 1. For such a case, the accessible ends of the hollow member can be provided with removable plugs, if need be.

The invention is applicable to various types of gate valves, such as plunger gate valves, lever gate valves, knife gate valves.

The invention finds a particularly advantageous application for the purposes of heating of the valve body 2 in order to overcome and possibly prevent the problems of freezing described previously, which are typical in the case of use of valves on vehicles for the transport/treatment of liquids. It will be appreciated, however, that the valve according to the invention can be used also in other spheres in which the same problems arise, for example, in systems that are subject to severe conditions of use, such as animal-breeding plants and similar liquid distribution and/or storage systems.

It will likewise be appreciated that, for some applications, the thermal carrier fluid that is to pass in the hollow member of the valve could be a cooling fluid, instead of a heating fluid.

The invention claimed is:

1. A tank valve comprising:
 a hollow valve body made of metal material integrally defining a front wall, a back wall and a side wall, the front wall, the back wall and the side wall each having an inner side, an outer side and a thickness, the inner side of the front wall and the inner side of the back wall being spaced from each other, wherein the front wall, the back wall and the side wall define a hollow volume for passage of a liquid, a lower portion of the side wall forming a bottom of the hollow volume, the valve body integrally defining an inlet and an outlet of the hollow volume, one of the inlet and the outlet being defined at front wall and the other one of the inlet and the outlet being defined at the back wall,
 an open/close member, mounted displaceable in the valve body, the open/close member having a peripheral profile including two opposite side portions and a lowermost portion,
 an anti-freezing arrangement,
 wherein the valve body is a cast valve body that also integrally defines, in an intermediate position between the front and the back walls, a valve seat in which the open/close member is displaceable between a raised position and a lowered position, for enabling or preventing passage of the liquid from the inlet to the outlet, respectively,
 wherein the valve seat is integrally formed in the valve body in a spaced-apart position with respect to the inner sides of the front and back walls, the valve seat being at least partly defined at the inner side of the side wall,
 wherein a lowermost portion of the valve seat is defined at the inner side of the lower portion of the side wall, in such a way that the lowermost portion of the valve seat is engageable by the lowermost portion of the peripheral profile of the open/close member when the open/close member is in said lowered position,
 wherein the anti-freezing arrangement comprises an axially extended hollow member embedded in the metal material constituting the valve body, for passage of a heating fluid, the hollow member having respective inlet and outlet ends accessible from outside the valve body and designed for connection to a circuit of the heating fluid,
 wherein a lower stretch of the hollow member intermediate to the inlet and outlet ends thereof is embedded in the metal material forming the lower portion of the side wall, the lower stretch of the hollow member extending in length in a position comprised between the lowermost portion of the valve seat and the outer side of the lower portion of the side wall.

2. The valve according to claim 1, wherein:
at least a substantial portion of the hollow member develops in length along a corresponding portion of the valve seat, said substantial portion of the hollow member and said corresponding portion of the valve seat being aligned to each other in a direction of displacement of the open/close member between said raised and lowered positions.

3. The valve according to claim 1, wherein:
a lowermost portion of the hollow member develops in length substantially parallel to the lowermost portion of the peripheral profile of the open/close member, said lowermost portion of the hollow member and said lowermost portion of the peripheral profile of the open/close member being aligned to each other in a direction of displacement of the open/close member between said raised and lowered positions.

4. The valve according to claim 1, wherein
the hollow member develops in length according to a respective axis which is substantially contained in a plane to which a sliding axis of the open/close member belongs.

5. The valve according to claim 1, wherein the hollow member comprises a tube.

6. The valve according to claim 5, wherein the tube includes a main stretch, that extends as an arc of a circle, for not more that about 180°, substantially parallel to a corresponding portion of the peripheral profile of the valve seat.

7. The valve according to claim 6, wherein the main stretch extends between two generally straight stretches of the tube, said two stretches being at least in part parallel to each other.

8. The valve according to claim 5, wherein the tube is a tube made of a metal material different from the metal material constituting the valve body.

9. The valve according to claim 5,
wherein the accessible ends of the hollow member comprise pipe fittings for connection to a circuit of the thermal carrier fluid;
and wherein the pipe fittings are configured as components distinct from the tube and coupled thereto.

10. The valve according to claim 5,
wherein the accessible ends of the hollow member comprise pipe fittings for connection to a circuit of the thermal carrier fluid;
and wherein the pipe fittings are defined integrally in the tube.

11. The valve according to claim 1,
wherein the side wall has two opposite lateral portions each forming a respective flank of the hollow volume, and
wherein the accessible ends of the hollow member are each located at a respective one of said lateral portions of the side wall.

12. The valve according to claim 1, wherein the accessible ends of the hollow member comprise pipe fittings for connection to a circuit of the thermal carrier fluid.

13. The valve according to claim 1, wherein the valve is a gate valve.

14. The valve according to claim 1, wherein the open/close member is one of a wedge open/close member and a knife one/close member.

15. The valve according to claim 1, wherein
a head is sealingly fixed to the valve body, in a positive opposite to the lower portion of the side wall, the head forming a top of the hollow volume, and
the valve comprises an actuation arrangement for causing displacements of the open/close member between the lowered position and the raised position.

16. The valve according to claim 15, wherein
the head defines a passage for a maneuvering stem which belongs to said actuation arrangement, the maneuvering stem having an upper end and a lower end,
the open/close member has a body defining at the top thereof a coupling, in which the lower end of the maneuvering stem is fitted in a freely rotating way, the upper end of the maneuvering stem projecting from the head outside the hollow volume.

17. Use of a valve according to claim 1, on a vehicle for the transport of liquids having a circuit for a heat-exchange fluid of a cooling system of a vehicle engine, the accessible ends of the hollow member being set in fluid communication with said circuit for the heat-exchange fluid.

18. A process for producing a valve according to claim 1, comprising the step of forming the valve body by means of chill casting, the chill being provided with means for supporting and positioning the hollow member.

19. The process according to claim 18, wherein the chill comprises at least two half-chills and said means for supporting and positioning comprise at least one of:
a seat defined in each half-chill for positioning a respective portion of the hollow member;
at least one insert positioned between the two half-chills, which provides a positioning support for the hollow member, in particular in an intermediate region thereof between its two ends;
a seat in each half-chill for a pin for positioning the hollow member at its opposite ends, each pin having a portion for coupling on the outside of the corresponding half-chill, and a portion for insertion in the corresponding end of the hollow member.

20. The process according to claim 18, wherein the hollow member is inserted in the chill after being pre-heated.

21. The process according to claim 18, wherein the chill has a system for bleeding off any possible gas that might be released inside the hollow member during the step of pouring of the material into the chill.

22. The valve according to claim 1,
wherein the side wall has two opposite lateral portions each forming a respective flank of the hollow volume, one said accessible end of the hollow member being located at one said lateral portions of the side wall,
wherein the hollow member has at least one lateral stretch extending between said lower stretch and said one accessible end,
wherein said lateral stretch of the hollow member is embedded in the metal material forming said one lateral portion of the side wall, the lateral stretch of the hollow member extending in length in a position comprised between the inner side and the outer side of said one lateral portion of the side wall.

23. The valve according to claim 1,
wherein the valve seat has two facing side surfaces between which the open/close member is displaceable between said raised and lowered positions, the two facing surfaces of the valve seat being closer to each other at the lowermost portion of the valve seat than at an uppermost portion of the valve seat.

24. Use of a valve according to claim 1, in a liquid distribution system and/or a storage system.

25. A valve comprising:
a hollow valve body made of metal material integrally defining a front wall, a back wall and a side wall, the front wall, the back wall and the side wall each having an inner side, and outer side and a thickness, the inner side of the front wall and the inner side of the back wall being spaced from each other, wherein the front wall, the back wall and the side wall define a hollow volume for passage of a liquid, a lower portion of the side wall forming a bottom of the hollow volume, the valve body integrally defining an inlet and an outlet of the hollow volume, one of the inlet and the outlet being defined at front wall and the other one of the inlet and the outlet being defined at the back wall, an open/close member, mounted displaceable in the valve body, the open/close member having a peripheral profile including two opposite side portions and a lowermost portion, an anti-freezing arrangement, wherein the valve body is a cast valve body that also integrally defines, in an intermediate position between the front and the back walls, a valve seat in which the open/close member is displaceable between a raised position and a lowered position, for enabling or preventing passage of the liquid from the inlet to the outlet, respectively, wherein the valve seat is integrally formed in the valve body in a spaced-apart position with respect to the inner sides of the front and back walls, the valve seat being at least partly defined at the inner side of the side wall, wherein a lowermost portion of the valve seat is defined at the inner side of the lower portion of the side wall, in such a way that the lowermost portion of the valve seat is engageable by the lowermost portion of the peripheral profile of the open/close member when the open/close member is in said lowered position, the anti-freezing arrangement comprises an axially extended hollow member embedded in the metal material constituting the valve body, for passage of a heating fluid, the hollow member having respective inlet and outlet ends accessible from outside the valve body and designed for connection to a circuit of the heating fluid, wherein the side wall has two opposite lateral portions each forming a respective flank of the hollow volume, wherein the hollow member has at least one lateral stretch embedded in the metal material forming said one lateral portion of the side wall, the lateral stretch of the hollow member extending in length in a position comprised between the inner side and the outer side of said one lateral portion of the side wall, wherein at least a substantial portion of the hollow member develops in length along a corresponding portion of the valve seat, said substantial portion of the hollow member and said corresponding portion of the valve seat being aligned to each other in a direction of displacement of the open/close member between said raised and lowered positions;

and wherein a lowermost portion of the hollow member develops in length substantially parallel to the lowermost portion of the peripheral profile of the open/close member, said lowermost portion of the hollow member and said lowermost portion of the peripheral profile of the open/close member being aligned to each other in said direction of displacement of the open/close member.

\* \* \* \* \*